Patented Oct. 21, 1941

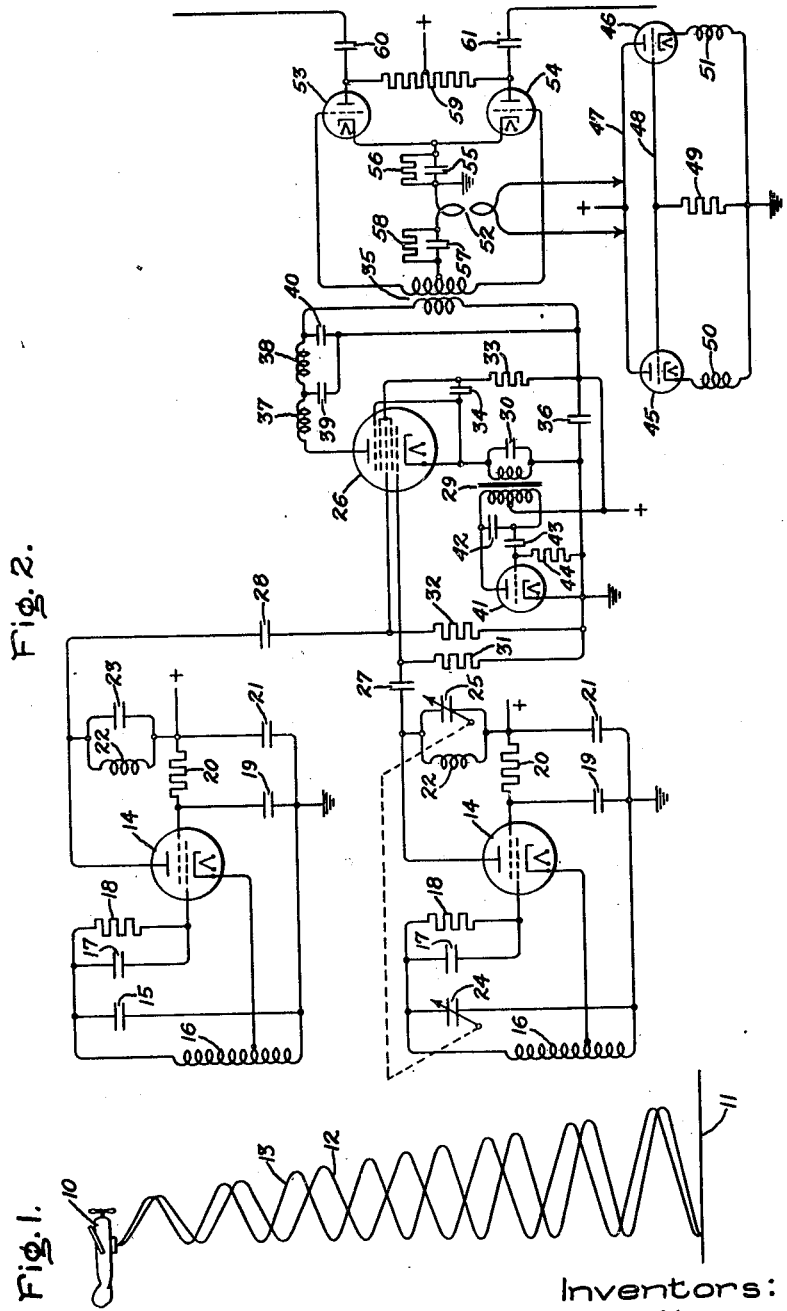

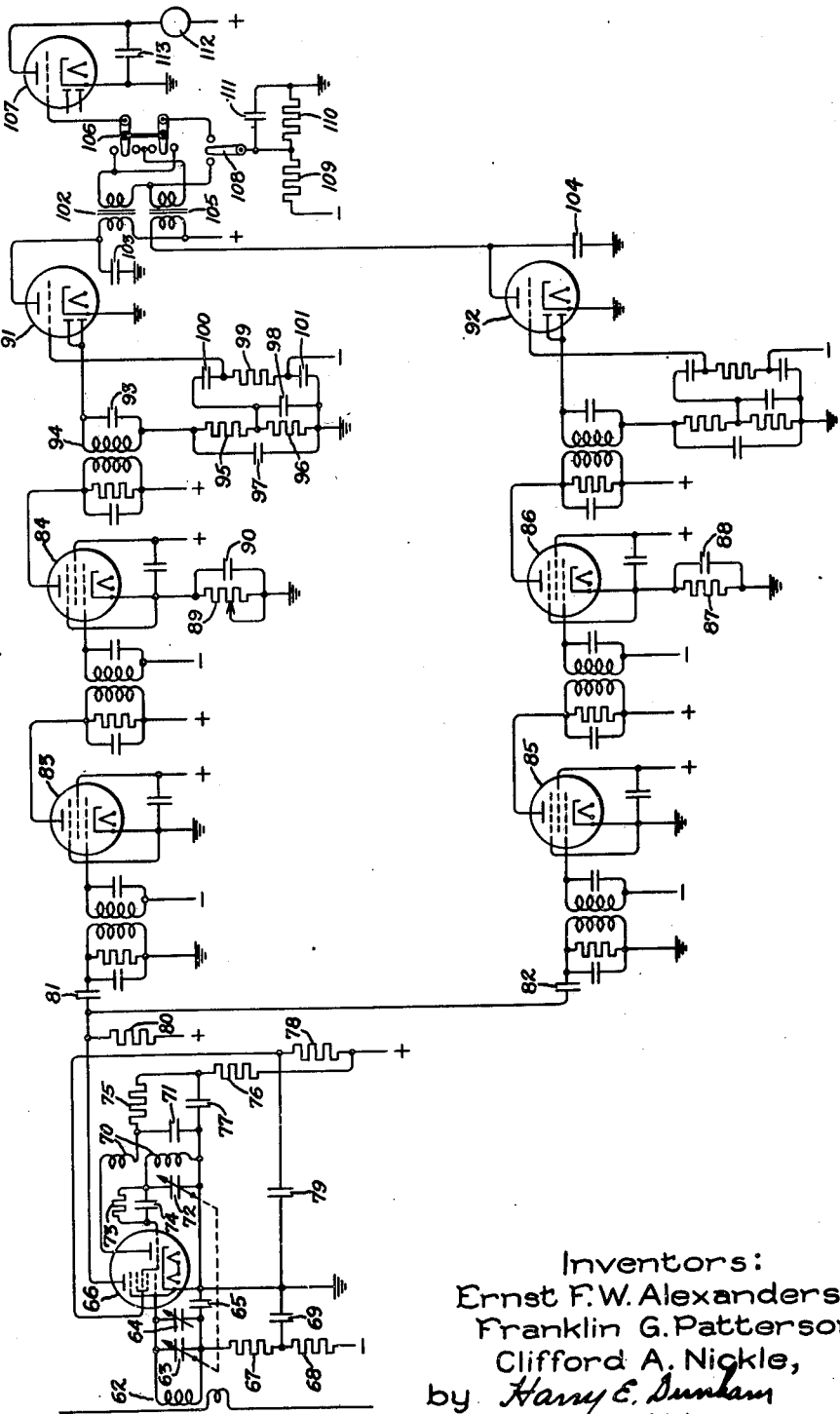

2,259,982

UNITED STATES PATENT OFFICE 2,259,982

RADIO DISTANCE METER

Ernst F. W. Alexanderson, Franklin G. Patterson, and Clifford A. Nickle, Schenectady, N. Y., assignors to General Electric Company, a corporation of New York Application September 29, 1939, Serial No. 297,124

12 Claims. (Cl. 250—1)

This invention relates to a method and apparatus for determining distance, and more particularly to distance measuring methods and apparatus operating by reflection of radio waves from the object to which it is desired to measure the distance.

It has been recognized that a radio wave transmitted toward a reflecting surface so as to set up a standing wave may be used to measure the distance to the surface. Such measurement is possible because the nodes and loops of the standing wave are fixed with respect to the reflecting surface, even though the means for creating these waves is moving. If the wave length of the transmitted wave be known, a count of the nodes or loops determines the distance to the reflecting surface.

When two waves of slightly different frequencies are transmitted toward a reflecting surface, so as to produce two separate standing waves, each corresponding to one of the transmitted waves, the nodes and loops of the respective standing waves are substantially coincident only at a distance from the reflecting surface which is great in relation to the wave length of either transmitted wave. The distance from the reflecting surface at which this coincidence occurs is inversely proportional to the difference in frequency of the two transmitted waves. Such coincidence of nodes and loops may therefore be used to measure the distance to the reflecting surface. It is accordingly an object of our invention to provide a method and means for measuring the distance to a reflecting surface wherein two waves of different frequency are simultaneously transmitted toward such a reflecting surface and in which the difference in frequency is adjusted to produce substantial coincidence of the resulting nodes and loops near the observer.

It is a further object of our invention to provide means for determining the space relation between a pair of standing waves of different frequencies. It is an important feature of our invention to provide receivers for detecting separately each of the two standing waves, these receivers being connected to compare the amplitudes of these waves at the position in space from which it is desired to measure the distance to a reflecting surface. It has been found that very suitable means for comparing the relative intensities of the two waves comprises a superheterodyne receiver which has an oscillator, a first detector, two separate intermediate frequency channels each of which is capable of transmitting only one of the two waves, a pair of second detectors, and means for comparing the output of the second detectors. A convenient form of transmitter for the two waves may suitably comprise a heterodyne generator for the difference frequency operating into a balanced modulator, which is excited by a high frequency oscillator generating a wave whose frequency is the average of the two desired waves. The balanced modulator may excite a transmitting antenna either directly or through an amplifier.

The features of our invention which we believe to be novel are set forth with particularity in the appended claims. Our invention itself, however, both as to its organization and method of operation, together with further objects and advantages thereof may best be understood by reference to the following description taken in connection with the accompanying drawings in which Figure 1 is a diagrammatical representation of two separate standing waves produced in accordance with our invention between an airplane and the earth; Figure 2 illustrates the circuit of a transmitter constructed in accordance with our invention; and Figure 3 illustrates the circuit of a receiver adapted for use therewith.

Referring to Figure 1, an airplane 10 is equipped with suitable means for transmitting two separate radio waves of slightly different frequency toward the earth 11. Each of these waves is reflected from the surface of the earth and, as may be understood from known principles of reflection, produces a standing wave. The standing wave of lower frequency is indicated in the drawings by a curve 12 and the standing wave of higher frequency by a curve 13. As these curves are drawn, they indicate that the standing waves are coincident at the surface of the earth and at the airplane. It is, of course, understood that additional points of coincidence exist at higher altitudes. At the surface of the earth coincidence must exist for the two standing waves reflected therefrom. Therefore, the configuration of such standing waves may be considered as fixed in space with respect to the earth. The airplane 10 has been indicated as being positioned at an altitude such that the amplitudes of the two separate standing waves coincide in its immediate vicinity. It is, of course, understood that the two waves are of tremendously higher frequency than is indicated by the number of amplitude variations illustrated in the drawings, so that a considerable number of substantially coincident cycles of amplitude variation lie in the immediate vicinity of the airplane.

The apparatus which has been devised for carrying out the present method of distance determination is responsive to the difference in amplitude of the two standing waves at the airplane. It is therefore obvious that the airplane may change altitude at random over a certain range, in which the standing waves are substantially coincident in amplitude, without altering the reading of the radio altimeter substantially.

A very convenient and easily operable form of transmitter for the two radio waves is illustrated in Figure 2. This transmitter includes a heterodyne generator, which comprises a converter stage for obtaining a wave whose frequency is the difference of the frequencies of waves generated by a pair of oscillators. One of the oscillators of the heterodyne generator has a fixed frequency and the other has an adjustable frequency, by adjustment of which the frequency of the output of the heterodyne generator may be controlled.

The fixed frequency oscillator, which forms a part of the heterodyne generator, is of the electron coupled type and includes a pentode tube 14 connected to a resonant circuit made up of a condenser 15 and a coil 16. The resonant circuit has one end connected through a condenser 17 and a grid leak resistance 18 to the first or control grid of the tube 14. The other end of the resonant circuit is connected to ground and also through a blocking condenser 19 to the second grid of the tube 14. This second grid is supplied with operating current through a voltage dropping resistor 20 connected to a suitable source of operating potential. The source of potential is shunted to ground through a filter condenser 21. The cathode of tube 14 is connected to an intermediate point of the coil 16. The second grid of the tube 14 acts as an anode, so that oscillations are produced in the resonant circuit by variations in potential of the cathode and first grid of the tube 14.

Power is taken from the tube 14 through its main anode which is connected to the source of operating potential through a second resonant circuit tuned to the same frequency as the condenser 15 and coil 16. This second resonant circuit includes a coil 22 and a condenser 23.

The adjustable frequency oscillator in the heterodyne generator is similar to the fixed frequency oscillator and includes many similar parts which are given like reference numerals. A variable condenser 24 is substituted for the fixed condenser 15 and a variable condenser 25 for the condenser 23, in order that the respective resonant circuits may be adjusted in frequency. For convenience these condensers are connected together mechanically for unitary operation, or unicontrol.

The converter stage includes a pentagrid type tube 26 whose first grid is connected by a coupling condenser 27 to the anode of the tube 14 in the adjustable frequency oscillator. The third grid of the tube 26 is connected by a coupling condenser 28 to the anode of the tube 14 in the fixed frequency oscillator. The cathode of the tube 26 is connected to ground through the secondary of a low frequency transformer 29 which has a high frequency bypassing condenser 30 connected in shunt thereto to maintain the cathode at ground potential for high frequencies. The first and third grids of the tube 26 are connected to ground through resistors 31 and 32 respectively. The resistors are of proper size to maintain these grids at proper bias potentials. The second and fourth grids of the tube 26 are screen grids and are connected to a suitable source of operating potential through a voltage dropping resistor 33. These screen grids are also connected through a high frequency by-passing condenser 34 to the cathode of the tube 26. The fifth grid of the tube 26 is a suppressor grid and is connected directly to the cathode. The anode of the tube 26 is connected through a low pass filter and the primary of an output transformer 35 to a source of operating potential, which may conveniently be that which supplies energy to the screen grids. The source of operating potential is shunted to ground by a high frequency by-passing condenser 36. The low pass filter includes a coil 37 connected at one end to the anode of tube 26 and connected at the other end to a coil 38 and a condenser 39. The other terminal of the condenser 39 is connected to the source of operating potential. The other end of the coil 38 is connected to the primary of the transformer 35 and to a condenser 40, whose other terminal is connected to the source of operating potential. The other end of the primary of the transformer 35 is also connected to the source of operating potential to supply energy to the anode of tube 26. The low frequency transformer 29 introduces a signal of a fixed low frequency into the output of the heterodyne generator for the purpose of recognition and convenient measurement of the primary wave. This low frequency wave is produced by an oscillator formed by a triode tube 41, whose cathode is connected to ground, and whose anode is connected to one end of a tuned circuit comprising the primary of the transformer 29 and a condenser 42 connected in shunt thereto. An intermediate point of the primary of the transformer 29 is connected to a source of operating potential which may conveniently be that which supplies energy to the anode of the tube 26. The remaining end of the tuned circuit is connected through a coupling condenser 43 to the grid of the tube 41. This grid is connected to ground through a grid leak resistor 44.

In operation, this heterodyne generator is a convenient device for producing a wave whose frequency may be adjusted between very wide limits. For example, it may be desired to measure distances between 100 and 50,000 feet. The heterodyne generator may accordingly be arranged to produce a wave whose frequency is adjustable between about 5 and 2500 kilocycles. Certain values which may be used in the heterodyne generator are given by way of example. The wave of adjustable frequency may be suitably modulated by a low frequency wave of 500 cycles. The fixed frequency oscillator of the heterodyne generator may be designed to operate at 10 megacycles and the adjustable frequency oscillator at from 10 to 12½ megacycles. These values are given purely as suggestive of appropriate values, as other values may be considered more desirable in certain instances. The low pass filter is arranged to prevent transmission to the transformer 35 of any waves above 2500 kilocycles.

The transformer 35 is coupled to the circuit of a balanced or carrier suppressing modulator which is arranged to produce two very high frequency waves separated in frequency by twice the frequency imposed on the transformer 35 by the heterodyne generator. This balanced modulator is excited by a suitable high frequency oscillator for the generation of a wave which, when modulated by the wave from the transformer 35, produces only a sum and a difference component, which are the two required waves.

The high frequency oscillator for exciting the balanced modulator comprises a pair of triode tubes 45 and 46 whose anodes and whose grids are respectively connected by a pair of parallel transmission lines 47 and 48. The center point of the line 47 is connected to a suitable source of operating potential and the center point of the line 48 is connected through a grid leak resistance 49 to ground. The cathodes of tubes 45 and 46 are respectively connected to ground through high frequency choke coils 50 and 51. The primary of a high frequency transformer 52, which may be a single loop of wire, is connected to two points on the line 47 equally spaced apart on opposite sides of the connection to the source of operating potential. As described, this high frequency oscillator is arranged to operate in push-pull relation and supplies the transformer 52 from a balanced connection.

The balanced modulator comprises a pair of triode tubes 53 and 54 whose cathodes are connected together and through a condenser 55 and a biasing resistor 56 in shunt thereto to ground and to one side of the secondary of the transformer 52. The other side of the secondary of the transformer 52 is connected through a condenser 57 and a grid leak resistor 58 in shunt thereto to the center tap of the secondary of the transformer 35. The ends of the secondary of the transformer 35 are connected respectively to the control grids of the tubes 53 and 54. The anodes of the tubes 53 and 54 are connected together through a load resistor 59, whose center tap is connected to a suitable source of operating potential. The anode of the tube 53 is connected by a coupling condenser 60 to one branch of a dipole antenna and the anode of the tube 54 is connected through a coupling condenser 61 to the other branch of the dipole antenna.

In operation, the heterodyne generator produces a wave whose frequency is adjustable, as explained above, between 5 kilocycles and 2½ megacycles. It is advantageous that the frequency of the high frequency oscillator exciting the modulator should be very high; for example, 600 megacycles or more. The balanced modulator produces two waves whose frequencies are respectively the sum and the difference of the high frequency wave produced by the high frequency oscillator and the adjustable frequency wave produced by the heterodyne generator. These two waves produced by the balanced modulator are transmitted to the dipole antenna and are radiated therefrom. No wave directly from the high frequency oscillator is transmitted to the antenna. It is preferred that means be used to direct these waves from the observer toward the object from which they are to be reflected. A suitable directive antenna array may be used, for example.

A suitable receiver and indicator for the two transmitted waves is illustrated by Fig. 3. A dipole antenna is so arranged as to be excited by waves reflected from the object whose distance is to be measured, and is preferably well enough shielded from the transmitting antenna and arranged in a position of low field strength with respect to the transmitting antenna, so that waves received directly therefrom are not so strong as to prevent detection of heterodyne frequencies between the reflected waves and the directly received waves. The heterodyne or standing waves formed between each of the reflected waves and the corresponding transmitted wave are represented in Figure 1 by the two separate curves 12 and 13.

The receiving dipole antenna excites the primary of a transformer 62 whose secondary is shunted by an adjustable condenser 63 and a trimming condenser 64 to form a circuit which oscillates in response to the two received waves. This circuit is connected at one end through a blocking condenser to ground and to the cathode of a duplex-triode-heptode tube 66 and at other end to the first or control grid of the heptode section of the tube 66. That end of the tuned circuit connected to the condenser 65 is also connected through two resistors 67 and 68 arranged in series to a suitable source of grid bias potential. A filter condenser 69 is connected from ground to a point between the resistors 67 and 68.

The triode section of the tube 66 is connected to form an oscillator to produce a wave for converting the incoming signals to an intermediate frequency. The anode of the triode section is connected to the primary of a transformer 70 which is connected in turn to a condenser 71, whose other terminal is connected to the cathode of the tube 66 to maintain one end of the primary at cathode potential. The primary of the transformer 70 is inductively related to its secondary, which is shunted by an adjustable condenser 72 to form a circuit tuned to the oscillator frequency. One end of the secondary of the transformer 70 is connected to the cathode of the tube 66 and the other end is connected through a grid leak resistance 73 and a condenser 74 in shunt thereto to the control grid of the triode section of the tube 66. The anode of the triode section is supplied with operating potential through the primary of the transformer 70, a resistor 75, and a resistor 76, all connected in series. A filter condenser 77 is connected from ground to a point between the resistors 75 and 76. The grid of the triode section is connected directly to the third grid of the heptode section of the tube 33 and the wave produced by the oscillator is transmitted thereby to the third grid of the heptode section, so that the electron stream in this section, which is controlled by the incoming waves, is modulated by the wave from the oscillator. The condensers 63 and 72 may conveniently be connected together mechanically for unitary operation. The resonant circuits formed by the coil 62, the condensers 63 and 72, and the secondary of transformer 70 are adjusted so that the sum or the difference of their frequencies is such as to produce the intermediate frequency desired; which may, for example, conveniently be 2 megacycles. The second and fourth grids of the heptode section of the tube 66 are screen grids and are connected to a suitable source of operating potential through a resistor 78 and to the cathode of tube 66 through a high frequency by-passing condenser 79. The fifth grid of the heptode section is a suppressor grid and is connected directly to the cathode. The anode of the heptode section of the tube 66 is connected through a resistor 80 to a suitable source of operating potential.

Voltage variations of intermediate frequency are produced by incoming signals on the anode of the heptode section in the tube 66. These voltage variations are transmitted alike to two intermediate frequency amplifiers by two condensers 81 and 82. The condenser 81 is connected from the anode of the heptode section of the tube 66 to an amplifier, which has a frequency characteristic such that it amplifies only waves produced by radiations of higher frequency than the frequency of the high frequency oscillator of Figure 2. The condenser 82 transmits voltage variations to the other intermediate frequency amplifier, which is designed to amplify only waves produced by received radiations of lower frequency than the waves from the high frequency oscillator of Figure 2.

The intermediate frequency amplifier connected to the condenser 81 comprises a pair of pentode tubes 83 and 84 each of which has suitable electrode connections including anode and control grid circuits which are capable of transmitting waves in a broad range of frequency. The other intermediate frequency amplifier, which is connected to the condenser 82, includes two pentode tubes 85 and 86 and is generally similar to the first intermediate amplifier except in the range of frequency which it is designed to transmit. The tube 86 in the second intermediate frequency amplifier has its cathode connected to ground through a fixed biasing resistor 87 shunted by a bypassing condenser 88. The tube 84 in the first intermediate frequency amplifier has its cathode connected to ground through an adjustable biasing resistor 89 shunted by a bypassing condenser 90. Adjustment of the biasing resistor 89 is provided in order that the gain of the parallel amplifiers may be made identical, so that comparison of their outputs may be made. These two amplifiers are not described in more detail, since their construction is of usual form. Each of the intermediate frequency amplifiers transmits its output to a separate second detector stage which demodulates its particular wave to produce a 500 cycle wave, whose amplitude is a measure of the amplitude of the corresponding standing wave at the receiving dipole antenna.

To accomplish this demodulation, a pair of duplex-diode-triode tubes 91 and 92 are connected respectively to the first and second intermediate amplifiers. The diode anodes of the tube 91 are connected to one end of a tuned circuit which includes a condenser 93 and a coil 94 coupled to the output circuit of the tube 84. The cathode of the tube 91 is grounded. The other end of the tuned circuit is connected through a resistor 95 and a resitosr 96 to ground. The point between the resistor 95 and the tuned circuit is connected to ground through a high frequency by-passing condenser 97. The point between the resistors 95 and 96 is connected to ground through a filter condenser 98. A resistor 99 is connected at one end through a condenser 100 to the point between the resistors 95 and 96 and it is connected at the other end through a condenser 101 to ground. A voltage is developed across the resistor 99 whose frequency is 500 cycles and whose amplitude is proportional to the amplitude at the receiver of the standing wave represented by the curve 13 in Figure 1. This standing wave is the one of higher frequency which is amplified by the tubes 83 and 84. One end of the resistor 99 is connected to the grid of the triode section of the tube 91 and the other end is connected to a suitable source of grid bias voltage. The anode of the triode section of the tube 91 is connected through the primary of a low frequency transformer 102 to a suitable source of operating voltage. This anode is also connected to ground through a by-passing condenser 103 which maintains the anode at cathode potential for intermediate frequencies but not for 500 cycles. The connections of the tube 92 with the second intermediate frequency amplifier are identical with those of the tube 91 with the other amplifier and are not described. The anode of the tube 92 is connected to ground through a high frequency by-passing condenser 104 and is connected through the primary of a low frequency transformer 105 to a suitable source of operating potential. The secondaries of the transformers 102 and 105 are connected together at one end; so that the voltage which appears between the remaining ends is the difference of the two 500 cycle voltages appearing from the two separate intermediate frequency amplifiers and their accompanying detectors. A double pole double throw switch 106 is arranged to connect either of the remaining ends of the secondaries of the transformers 102 and 105 to the control grid of a triode tube 107 and the other remaining end to one contact of a single pole double throw switch 108. The other contact of the switch 108 is connected to the common point of the two secondaries of the two transformers 102 and 105. The movable member of the switch 108 is connected through a resistor 109 to a suitable source of bias potential for the grid of the tube 107 and is also connected to ground through a resistor 110 and a condenser 111 in shunt thereto. The cathode of the tube 107 is connected to ground and the anode is connected through a direct current meter 112 to a suitable source of operating potential. The anode of the tube 107 is also connected to ground through a large by-passing condenser 113. The grid bias for the tube 107 is of such value that the tube operates on a non-linear portion of its characteristic, with the result that the continuous component of anode current which flows is a measure of the 500 cycle voltage impressed on the grid.

In operation, both of the standing waves, which are produced by the two transmitted waves and the respective reflected waves, are received by the receiving dipole antenna and converted to the intermediate frequencies by the oscillator and converter tube 66. Since the action of the balanced modulator in a transmitter is such that one wave must always be of greater frequency than the frequency of the high frequency oscillator and the other wave must be of lower frequency by the same amount, it is possible to design the two intermediate frequency amplifiers so that one accepts only signals corresponding to one standing wave and the other amplifier accepts only signals corresponding to the other. A very convenient comparison of the two standing waves is thus made possible. By demodulation, comparison of the 500 cycle waves resulting, and rectification of the difference between the 500 cycle waves, it is a simple matter to measure the space difference in the two standing waves.

For operation of the apparatus to determine altitude, a simple check is first desirable. The switch 108 is moved to connect the grid bias source to the common point of the secondaries of the two transformers 102 and 105. The switch 106 is then operated to connect the meter 112 to indicate the output of first one and then the other of the intermediate frequency amplifiers. By moving the switch 106 thus, an indication may be had that the separate intermediate frequency amplifiers are in operation. After this check, the switch 108 is moved to supply grid bias voltage through both of the secondaries of transformers 102 and 105 in series. The switch 106 may then remain in either position, since the difference of the output of the two intermediate frequency amplifiers is obtained in either case.

After the check for proper operation has been made, altitude or other distance may be determined by adjustment of the condensers 24 and 25. It is preferable to begin adjustment of these condensers 24 and 25, so that the adjustable frequency oscillator first operates nearest the frequency of the fixed oscillator. Otherwise, if the airplane is at a great altitude, the meter 112 may indicate a minimum when the condensers 24 and 25 are adjusted to a position corresponding to an altitude which is some integral fraction of the true altitude. In other words, although the meter 112 indicates a minimum, there may be one or more points of coincidence in the standing wave amplitudes between the airplane and the earth. There is a harmonic relation between the points of coincidence. The two condensers 24 and 25 are adjusted for an increasing frequency of the output of the heterodyne generator until the meter 112 reads a minimum, which is thus the lowest point of coincidence. If it be assumed that at this point the difference in frequency of the two transmitted waves is 100 kilocycles, the adjustable frequency oscillator is operating at a frequency 50 kilocycles higher than the fixed frequency oscillator. This frequency difference of 100 kilocycles corresponds to an altitude of about 4900 feet, which is one-half wave length of a wave of 100 kilocycles. The dial which is attached to the condensers 24 and 25 may conveniently be calibrated directly in the distance units.

The second, third, fourth and other points of coincidence may be used as checks on the first point of coincidence. Greater accuracy of indication is obtained by using these higher points of coincidence, since the rate of change of the difference in amplitudes with respect to the difference in frequencies is greater as one employs a higher point of coincidence. It is also obvious that distance is determined when the meter 112 reads a maximum, and that the meter may be calibrated in distance units if the frequency difference of the two standing waves be fixed therefor.

The method of distance determination which has been disclosed here may be performed by transmitting two waves of different frequency by any means whatever. Two entirely separate transmitters may be used in conjunction with a frequency meter for determining the difference in frequency of the two transmitters. Likewise, two separate receivers may be used if means are provided by which their outputs may be compared to indicate a coincidence between the two standing waves represented by the curves 12 and 13.

While we have shown a particular embodiment of our invention, it will, of course, be understood that we do not wish to be limited thereto, since different modifications may be made both in the circuit arrangements and instrumentalities employed, and we aim by the appended claims to cover any such modifications as fall within the true spirit and scope of our invention.

What we claim as new and desire to secure by Letters Patent in the United States is:

1. In combination in a device for measuring the distance from a point to a reflecting surface, means for simultaneously propagating a pair of waves of different frequencies toward said surface to produce separate standing waves at said point between each of said waves and the corresponding wave reflected from said surface, and means for comparing the intensities of said separate standing waves at said point.

2. In combination in a device for measuring the distance from a point to an object, means for simultaneously propagating a pair of radio waves of different predetermined high frequencies toward said object, each of said radio waves being reflected from said object to produce a standing wave at said point, and means for comparing the amplitudes of the pair of standing waves at said point.

3. Apparatus for measuring the distance from a point to an object which comprises means for producing a pair of standing waves at said point by reflection from said object of separate simultaneously propagated radio waves of different predetermined frequencies, means for adjusting the difference in said frequencies, and means for indicating the relative intensities at said point of said pair of standing waves during adjustment of said frequencies.

4. Apparatus for measuring the distance from a point to an object which comprises means for producing a pair of standing waves at said point by reflection from said object of two radio waves of different predetermined frequencies, and means for comparing the intensities at said point of said two standing waves, said last means comprising a heterodyne receiver having a separate low frequency channel for each of said waves and a current responsive device for comparing the outputs from said two channels.

5. Apparatus for measuring the distance from a point to an object which comprises means for producing a pair of standing waves at said point by reflection from said object of two radio waves of different predetermined frequencies, and means for comparing the intensities at said point of said two standing waves, said last means comprising a superheterodyne receiver having a separate intermediate frequency channel for each of said waves, a rectifier connected to each of said channels, and a current responsive device connected serially with said rectifiers to compare the outputs of said two channels.

6. Apparatus for measuring the distance from a point to an object which comprises means including a balanced modulator for producing a pair of standing waves at said point by reflection from said object of separate simultaneously propagated radio waves of different predetermined frequencies, means including an oscillator connected to said balanced modulator for adjusting the difference in said frequencies, and means for comparing the amplitudes at said point of the pair of standing waves.

7. The method of measuring the distance from a point to an object which comprises propagating simultaneously a pair of waves of different frequencies toward said object so that each wave on reflection from said object forms a standing wave at said point, and comparing the intensities of said separate standing waves at said point.

8. The method of measuring the distance from a point to an object which comprises producing a pair of standing waves at said point by reflection from said object of separate simultaneously propagated radio waves of different frequencies, comparing the amplitude of said standing waves at said point, and adjusting the difference in frequency of said waves until the amplitudes of said waves at said point have a predetermined relation.

9. Apparatus for indicating the distance from a point to a reflecting surface which comprises means for transmitting a pair of waves of different frequencies toward said surface to produce a corresponding pair of standing waves at said point, means for energizing a separate circuit by each of said standing waves at said point, and means for comparing the intensities of energy in said two separate circuits.

10. The combination, in a device for measuring distance from a point to a remote reflecting surface, of means for radiating waves of a plurality of frequencies towards said surface for reflection therefrom thereby to produce standing waves at said point having each of said plurality of frequencies, and means responsive to the relation at said point between the intensities of said standing waves of two different frequencies.

11. In combination, in a device for measuring the distance from a point to a reflecting surface by the use of two separate waves of different frequencies, means for simultaneously propagating a pair of such waves of different frequencies towards said surface to produce separate standing waves at said point, means at said point for receiving such waves of different frequencies, and means energized from said receiving means for producing a voltage corresponding to the relation at said point between the intensities of said two standing waves at said receiving means.

12. In a system for measuring distance to a reflecting object from a point, said system having receiving means at said point arranged for reception of separate waves of different frequencies, the method which comprises propagating a plurality of high frequency waves of predetermined different frequencies towards said object for reflection therefrom to produce standing waves at said point, receiving each wave and detecting the intensity thereof, and adjusting the difference between the frequencies of two of the propagated waves such that the intensities of said standing waves at said point have a predetermined relation, whereby the difference between the frequencies of said waves, so adjusted is interpetable in terms of distance from said point to said object.

ERNST F. W. ALEXANDERSON.
FRANKLIN G. PATTERSON.
CLIFFORD A. NICKLE.